United States Patent [19]

Penumella

[11] Patent Number: 6,113,802
[45] Date of Patent: Sep. 5, 2000

[54] COMPOSITIONS FOR AND SYNTHESIS OF IMPROVED INSULATIONS

[75] Inventor: Srinivas Penumella, Cincinnati, Ohio

[73] Assignee: Micropyretics Heaters International, Inc., Cincinnati, Ohio

[21] Appl. No.: 09/044,579

[22] Filed: Mar. 19, 1998

[51] Int. Cl.⁷ .................................................. E04B 1/74
[52] U.S. Cl. .............................. 252/62; 501/99; 501/100; 501/101; 501/102; 501/103; 501/105; 501/108; 501/127; 501/128
[58] Field of Search .................................. 252/62; 501/99, 501/100, 101, 102, 103, 105, 108, 127, 128

[56] References Cited

U.S. PATENT DOCUMENTS

| | | | |
|---|---|---|---|
| 3,171,720 | 3/1965 | Shea et al. ................................. | 501/99 |
| 3,227,566 | 1/1966 | Hilton et al. ................................ | 501/99 |
| 3,649,314 | 3/1972 | James ......................................... | 501/99 |
| 3,775,139 | 11/1973 | Gamble et al. ............................ | 501/99 |
| 4,540,675 | 9/1985 | Morris et al. .............................. | 501/99 |
| 4,544,641 | 10/1985 | Dumas et al. ............................. | 501/87 |
| 4,987,105 | 1/1991 | Wright ....................................... | 501/99 |
| 5,656,563 | 8/1997 | Chen et al. ................................ | 501/99 |

FOREIGN PATENT DOCUMENTS 405843  11/1973  U.S.S.R. .

*Primary Examiner*—Paul Marcantoni
*Attorney, Agent, or Firm*—Jayadeep R. Deshmukh

[57] ABSTRACT

An insulation material which is substantially free of fibers and which has a density of less than about 2.5 g/cc and a thermal conductivity of less than about 5 W/Km is formed from a composition comprising at least about 2%, by weight, carbon. The insulation material is resistant to thermal shock and is easily machined.

10 Claims, No Drawings

COMPOSITIONS FOR AND SYNTHESIS OF IMPROVED INSULATIONS

TECHNICAL FIELD

This invention relates to compositions for and synthesis of improved insulations. More particularly, this invention relates to compositions for and methods of synthesizing low density insulation which is substantially free of fibers. The insulation is easily machinable and resistant to thermal shock.

BACKGROUND ART

Insulating materials are used in many industries, including the iron and steel, aluminum, glass, cement, refining and petrochemical, and waste energy industries. Insulations, particularly high temperature insulations, are widely used in furnaces, particularly ceramic firing furnaces.

Insulation boards and other geometric forms can be generally divided into two categories, shaped insulation bricks and unshaped insulation bricks. Shaped insulation include alumina bricks, alumina-carbon bricks, magnesia-carbon bricks and coatings, and gunning castable insulation. Shaped insulation can be used for items such as slide gates, nozzles, porous plugs and shrouds for continuous casting. Low temperature class insulations, insulations used at temperatures below about 1000° C., are generally shaped insulations. Unshaped insulations are not preshaped, but are machined into a usable form. High temperature class insulations, also called refractories, which are used at temperatures above about 1000° C., are generally unshaped and machined into usable form.

High temperature insulations are mostly used in furnaces. As such insulations are not preshaped, it is desirable that the insulation material be lightweight and easily machined. Additionally, as furnaces often rapidly cycle between temperatures it is important that the refractory material be resistant to thermal shock. Further, insulating bricks will preferably have a low thermal conductivity, as this increases energy efficiency of the furnace.

Pure alumina or zirconia bricks may be used in furnaces operating at temperatures above about 1500° C., however, such bricks are dense, difficult to machine, and not particularly resistant to thermal shock. Additionally, such bricks have high thermal conductivity, which diminishes the energy efficiency when used as a furnace lining.

Insulation materials for use in furnaces may be comprised with low thermal connectivity materials such as alumina, alumina silica or combinations thereof. These materials are porous, as this lowers the thermal conductivity. Such materials are generally low in density and easily machinable. However, when such insulations are prepared for use at temperatures above 1200° C., they usually contain fibers of alumina, silica, alumina silicates or mixtures thereof.

Insulation bricks may be made with high temperature advanced composites which comprise materials such as silicon nitride, silicon oxynitrides, silicon aluminum oxynitrides, silicon carbide and titanium diboride. Carbides, borides and nitrides have been incorporated into composite materials in order to increase the high temperature mechanical properties of the insulation. However, such composite materials are often difficult to machine. Further, alumina, mullite, zirconia and other ceramics which are substantially free of fibers generally have poor resistance to thermal shock and will crack or shatter easily upon rapid cooling. The use of fibers in composite insulation materials have been shown to increase resistance to thermal shock, and therefore fibers are generally included in such compositions.

Fibrous insulation materials generate airborne fibers during manufacture, use and disposal. Unfortunately, airborne fibers pose potential health hazards for the fibers are irritants to the skin, eyes and upper respiratory system. Generally about one fiber/cc per 8-hour exposure is the level commonly thought to be dangerous. Therefore, the manufacture, use and disposal of fiber containing insulation materials require the use of protective gear such as face and body masks.

Additionally, many insulating materials contain petroleum-like materials called pitch or resin. Pitch is normally used as a binder. However, the use of pitch as a binding material has certain disadvantages. Pitch is easily oxidized, and once the binding material in the insulation is oxidized there is no bonding to prevent grains from slag attack. Pitch is environmentally hazardous because it contains volatile compounds. Further, the use of pitch makes it difficult to incorporate strength improvement agents into the insulating material, and the use of pitch in insulating materials containing carbides or borides increases the sintering temperature required during the synthesis of the insulation.

Therefore, it would be advantageous to formulate an insulating material which is substantially free of fibers and substantially free of pitch, and which is low in density, resistant to thermal shock, easily machinable and has a low thermal conductivity.

SUMMARY OF THE INVENTION

Accordingly, it is an object of the invention to obviate various problems of the prior art.

It is another object of this invention to provide novel compositions and synthesis methods for high temperature insulations which are substantially free of fibers.

It is also an object of this invention to provide compositions and synthesis methods for insulating materials which are low in density, low in thermal conductivity, and which are resistant to thermal shock.

It is an additional object of this invention to provide novel compositions and synthesis methods for insulating materials which eliminate the potential health concerns arising from the use of fibers.

It is yet another object of this invention to provide high temperature insulating materials which are easily machinable, and which are resistant to slag and reducing gases.

In accordance with one aspect of the prevention there is provided an insulation material formed from a composition comprising at least about 2%, by weight, carbon, wherein the material is substantially free of fibers, has a density of less than about 2.5 g/cc and a thermal conductivity of less than about 5 W/Km. Further, the insulating material has a melting point of greater than about 1500° C., and an electronic electrical conductivity less than about 1/(ohm cm).

In accordance with another aspect of the invention, there is provided a method of forming an insulating product which is substantially free of fibers, comprising the steps of providing a composition comprising and at least about 2%, by weight, carbon and an ingredient selected from the group consisting of CaO, $Al_2O_3$, $ZrO_2$, MgO, $SiO_2$, oxynitrides, silicates, refractory carbides, refractory borides, refractory nitrides and mixtures thereof; and firing the composition to form an insulating product. The insulating product has a melting point of greater than about 1500° C., a density of less than about 2.5 g/cc, a thermal conductivity less than about 5 W/Km, and an electrical conductivity less than about 1/(ohm cm). The insulating product is resistant to thermal shock and is easily machinable.

In accordance with yet another aspect of the present invention, there is provided a method of controlling porosity in an insulating material which is substantially free of fibers, comprising the steps of providing a composition comprising at least about 2%, by weight, carbon, and firing the composition, wherein the composition is substantially free of pitch. The insulating material has a density of less than about 2.5 g/cc, a thermal conductivity of less than about 5 W/Km, and a porosity of from about 5 volume percent to about 70 volume percent.

In accordance with yet another aspect of the present invention, there is provided a paste composition comprising from about 2% to about 40%, by weight, carbon, an ingredient selected from the group consisting of CaO, $Al_2O_3$, $ZrO_2$, MgO, $SiO_2$, oxynitrides, silicates, refractory carbides, refractory borides, refractory nitrides and mixtures thereof, and a methyl cellulose, stearates, selected from the group consisting of water, clay, clay-water mixtures, polyvinyl alcohol, methanol, ethanol, acetone, polyvinyl butyl, colloidal silica, colloidal alumina, colloidal zirconia, colloidal ceria and mixtures thereof; wherein the paste is substantially free of fibers.

It has been found that it is possible to prepare an insulating material which is substantially free of fibers yet resistant to thermal shock, lightweight, porous, and easily machinable. The insulation has a low thermal conductivity, thereby increasing energy efficiency when used as a furnace lining, and is substantially free of fibers, thereby avoiding the detrimental health consequences arising from fibrous insulating materials. Further, it is possible to synthesize the insulating composition free of pitch, thereby avoiding the environmental hazards of pitch.

Additionally, it has been found that the insulating material can be produced by powder mixing, drying and firing. In contrast, most fiber containing insulations are formed by vacuum fiber forming and sintering. Therefore, the present invention provides a more cost efficient method of producing the insulation.

These additional objects and advantages will be more fully apparent in view of the following detailed description.

DETAILED DESCRIPTION

The present invention encompasses compositions and synthetic processes for forming a low density insulation which is substantially free of fibers and which is resistant to thermal shock. As used herein, an "insulation", "refractory", or "insulating material", is a material which is slow to soften and which resists heat. High temperature insulations are insulations used at temperatures of above about 1000° C.

As used herein, the term "machinability" of a product refers to the ease of which a product can be cut or shaped. As used herein, the term "easily machinable" will refer to the ability to cut or shape a finished product with hand tools, such as, for example, a putty knife. The term "hard to machine" is intended to refer to products wherein a power grinder, diamond tools, carbide tools, or hardened saws are required to cut through the material. Generally, materials which are dense and hard (greater than 4 on the Mohs scale of hardness) is difficult to machine. Materials having low density and low hardness (less than 4 on the Mohs scale of hardness) are generally less difficult to machine. It should be noted that material such as alumina can be very hard and difficult to machine when in a dense form, such as melted and cast aluminum, or fairly soft and easily to shape when made into a loosely agglomerated particles with high porosity.

As used herein, the term "thermal shock" is used to refer to the loss of fracture strength of a product after cycling from high temperature to low temperature. One method of quantifying thermal shock resistance is the measurement of the fracture strength retained after a particularly severe water quench from a high temperature. As used herein, the term "high thermal shock resistance" is intended to refer to the ability of an insulating material to retain at least about 5% of its strength after quenching from 1100° C. to room temperature in water. Such a shock treatment is so severe that most ceramics shatter, i.e., have zero retained strength. It is believed that such loss of strength occurs because the shock treatment enlarges cracks which are detrimental to retaining good fracture strength.

As used herein, all ratios and percentages are by weight, unless otherwise specified.

The insulation material is formed from a composition comprising, by weight, at least about 2%, preferably from about 2% to about 40%, more preferably from about 6% to about 40%, and most preferably from about 10% to about 40%, by weight, carbon. The carbon comprises elemental carbon, preferably the carbon source is graphite. Preferably, the carbon comprises carbon grains of two different sizes. The composition may contain, for example, a first carbon source have a particle size of about -300 mesh, and a second carbon source having a particle size of from about -20 to about 150 mesh. While not being bound by theory, it is believed that the carbon does not act as a binder, but rather as an agent which becomes gaseous on heating and expands, thereby giving rise to a controlled porosity. As used herein, carbon is not intended to refer to carbon-containing petroleum products such as pitch.

The composition may comprise an ingredient selected from the group consisting of glass beads, CaO, $Al_2O_3$, $ZrO_2$, MgO, $SiO_2$, oxynitrides, silicates, refractory carbides, refractory borides, refractory nitrides and mixtures thereof; preferably the ingredient is selected from the group consisting of CaO, $Al_2O_3$, $ZrO_2$, MgO and mixtures thereof; more preferably the ingredient is $Al_2O_3$. When the insulation is to be used at temperatures of above about 1600° C., the composition preferably comprises from about 25% to about 95%, by weight, of an ingredient selected from the group consisting of $Al_2O_3$, MgO, $SiO_2$, $ZrO_2$, and mixtures thereof. When the insulation is to be used at temperatures up to about 1500° C., the composition preferably comprises glass beads at a level of from about 25% to about 50%, by weight. Suitable refractory carbides, borides and nitrides which may be added include borides, carbides and nitrides of silicon, titanium, zirconium, vanadium, iron, chromium, nickel, tungsten, molybdenum, manganese and mixtures thereof.

The composition may also contain a carrier material selected from the group consisting of aqueous carrier systems, organic carrier systems, inorganic carrier systems and mixtures thereof. Aqueous carrier systems include water and clay-water mixtures; organic systems include polyvinyl alcohol, methanol, ethanol, acetone, polyvinyl butyl, methyl cellulose, stearates and mixtures thereof; and inorganic systems include colloidal silica, colloidal alumina, colloidal zirconia, colloidal ceria, clays and mixtures thereof.

As used herein, clay refers to crystalline structures which have $Si_2O_5$ silicate sheets ionically bonded to other groups of atoms such as aluminum and oxygen, and is intended to encompass substances such as mica and talc. Suitable clays include kaolinite, bentonite and montmorrilonite. Preferably, the composition comprises from about 2% to about 20%, by weight, of a clay; preferably the clay is selected from the group consisting kaolinite, bentonite and mixtures thereof.

Commercial colloidal solutions or clay-water mixtures may contain some alkali oxides like $Na_2O$, CaO, LiO, and mixtures thereof. Preferably, the total amount of alkali oxides in the final product is less than about 0.5%, by weight, more preferably less than about 0.2%, by weight. The preferred ratio of liquid carrier to powder ingredients is from about 0 to about 30 mls of liquid carrier per 100 grams of powder.

The composition may further comprise antioxidants such as Al, B, Ca, Ce, Cr, Li, Mg, Ti, Zn, Zr and mixtures thereof, preferably the antioxidants is Al, Ti, Ca or mixtures thereof. Preferably, the antioxidants are present in an amount of from about 0% to about 20%, more preferably from about 8% to about 20%, by weight, of the composition.

The composition is substantially free of fibers, preferably free of, fibers. The composition is preferably substantially free of pitch, more preferably free of, pitch.

The insulating material is formed by the process of preparing the composition, and firing the composition to form an insulating product. In one embodiment, a paste is prepared for use as a paste or filler between insulation blocks of a furnace. The paste comprises from about 2% to about 40%, by weight, carbon; an ingredient selected from the group consisting of CaO, $Al_2O_3$, $ZrO_2$, MgO, $SiO_2$, oxynitrides, silicates, refractory carbides, refractory borides, refractory nitrides and mixtures thereof, and a carrier selected from the group consisting of water, clay-water mixtures, polyvinyl alcohol, methanol, ethanol, acetone, polyvinyl butyl, methyl cellulose, stearates, colloidal silica, colloidal alumina, colloidal zirconia, colloidal ceria and mixtures thereof. The paste is substantially free of, preferably free of, fibers and preferably substantially free of, more preferably free of, pitch. The paste may further comprise an antioxidant selected from the group consisting of Al, B, Ca, Ce, Cr, Li, Mg, Ti, Zn, Zr and mixtures thereof. The insulating product is formed in situ when the paste or filler between insulation blocks is fired.

In another embodiment, the composition is shaped before firing. The insulating material may be shaped by methods known in the art including pasting, cavity filling, molding, vibration compacting, tapping compacting, squeezing, extrusion and other methods normally used to process refractories and general classes of ceramics. The shape of the product may be made using any powder compacting process including loose tapping, vibration, pressing, or simple pliable manipulation of the green compact into a shape. In one embodiment, the composition is placed into a die, compacted, dried, and fired. In another embodiment, the composition comprises a carrier and an ingredient selected from the group consisting of CaO, $Al_2O_3$, $ZrO_2$, MgO, $SiO_2$ and mixtures thereof, and at least about 2%, by weight, carbon. The composition is air dried, and a colloidal carrier selected from the group consisting of colloidal silica, colloidal alumina, colloidal zirconia, colloidal ceria, and mixtures thereof is added to the composition. The colloidal carrier and composition is mixed to form a final mixture, the final mixture is placed into a die, compacted, dried, and sintered.

The sintering temperature is generally in the range of from about 1000° C. to about 2000° C. Preferably, the firing or sintering temperature should be equal to the temperature at which the insulating product is to be used. The product may be fired using a single step sintering treatment or a multiple step sintering treatment; preferably, a two-step sintering treatment is used. Suitable temperatures for a two-step sintering method are from about 1000° C. to about 1500° C. for the first sintering step, and from about 1500° C. to about 1800° C. for the second step. Low heating rates are preferable to prevent cracking.

Preferably, the insulating product has a melting point of greater than about 1500° C. more preferably greater than about 1800° C. Preferably, the density of the product is less than about 2.5 g/cc, more preferably the density is less than about 1.2 g/cc. The final product has porosity of from about 5 volume present to 70 volume percent, preferably from about 10 volume percent to 50 volume percent. The thermal conductivity of the product is preferably less than about 5 W/Km, more preferably less than about 1.5 W/Km, while the electrical conductivity is preferably less than about 1/(ohm cm), more preferably less than about 0.1/(ohm cm). The material has a high thermal shock resistance, and preferably retains at least about 5%, more preferably at least about 8%, of its strength, after quenching from 1100° C. to room temperature in water. The material is also easy to machine and may be shaped with hand tools. The composition is resistant to slag, reducing gases, and common metals.

The material is usable in short durations up to a temperature close to the melting point in order to survive run-away furnace temperatures which may happen, for example, if the furnace controller becomes faulty. Preferably, the material is used at a temperature about 100° C. below the melting point of the composition.

The insulating product may be used for industrial furnace, process treating equipment, and for special use in substrates in electronic or acoustic industries. The composition may be coated onto a substrate prior to firing. The composition may also be used as a paste or filler between insulating blocks and a furnace. Preferably the composition is used in high temperature industrial furnaces for high temperature processing.

Nonlimiting examples of the invention are set forth below.

EXAMPLES

Example 1

The ingredients for making a Mullite-5 wt % cristobalite type compositions are set forth in Table 1.

TABLE 1

| Powder characterization | | | |
|---|---|---|---|
| Powder | Average Particle size | Purity | Source |
| Al | −325 mesh | 99.5% | JM. Cat No: 11067 |
| C | −300 mesh | 99.0% | JM. Cat No: 10129 |
| $SiO_2$ | 5 microns | 99.5% | JM. Cat No: 13024 |
| $Al_2O_3$ | 15 microns | | Metlab. M412 |
| Clay | | | Aldrich, Cat No: 28,5234 |

The starting powder composition comprises, by weight, 33.655% alumina, 32.078% silica, 19.205% aluminum, 11.218% graphite and 3.844% bentonite. The insulating material is formed according to the following steps:

(i) A 500 g powder mixture is prepared comprising 168.275 g alumina, 160.39 g silicon oxide, 96.025 g aluminum, 56.09 g graphite and 19.22 g clay. The 500 g of the powder mixture is mixed with 375 ml liquid and adequate amount (preferably more than about 10 times by weight of the powder) of hard zirconium oxide balls in a glass container, and then the container is put in a rotary mixer for 12 hours.

(ii) The powder mixture is air dried for about 12 hours.

(iii) About 100 ml water is added to the powder mixture, and resulting mixture is thoroughly mixed. About one hour later mild heat will be produced from a weak exothermic reaction from the reaction of water and aluminum. The mixture is then cooled to room temperature. An additional about 100 ml of water is added to the mixture, and the mixture is thoroughly mixed.

(iv) The mixture is put into a 5×5×2 inch die, and is then pressed under pressure of 400 Psi by an automatic compacting machine to form a green (i.e. uncured) compacted sample. The green compacted sample contains some water.

(v) Two drying steps are performed. First the green compacted sample is air dried for 12 hours, and then the sample is placed into a 200° C. furnace for 12 hours.

(vi) The sample is sintered at about 1000° C.

(vii) The sample is then subjected to thermal treatment. The sample is heated from room temperature to 1110°C. and is held at that temperature for about 30 minutes, and is then heated to about 1450° C. and is held at that temperature for about 15 hours. The furnace is then turned off and the sample is allowed to cool.

Properties of the material are:

| | |
|---|---|
| Density: | 1.65 g/cm³ |
| Porosity: | 45.6% |
| Refractoriness: | 1600° C. |
| Color: | White |
| Fiber Content: | Nil |
| Mechanical Properties | |
| Machinability | Extremely easy to cut and machine with tools like hand saw etc. |
| Flexural Strength: (Mpa) | 35 |
| Elastic Modulus: (Gpa) | 16 |
| Thermal Properties | |
| Linear Thermal Expansion (×10⁻⁶/° C.) | 6.5 (R.T. – 1200° C.) |
| Thermal Conductivity (W/m° C.) | 0.78 (R.T. – 450° C.) |
| Thermal Diffusivity (cm²/sec) | 0.0041 (R.T. – 450° C.) |
| Specific Heat, Cp (cal/g ° C.) | 0.274 (R.T. – 1125° C.) |
| Thermal Shock Resistance Retained Strength, %) (ΔT–1100° C. Water Quench) | 11% |

Example 2

The ingredients for making a refractory material for use at a working temperature of around 1700°C. are set forth in Table 2.

TABLE 2

Powder characterization

| Powder | Average Particle size | Purity | Source |
|---|---|---|---|
| Al | –325 mesh | 99.5% | JM. Cat No: 11067 |
| C | –300 mesh | 99.0% | JM. Cat No: 10129 |
| C | –20 + 150 mesh | unknown | Graphite 900 |
| SiO₂ | 5 microns | 99.5% | JM. Cat No: 13024 |
| Al₂O₃ | –325 mesh | unknown | Alcoa T64-325-LI |
| Al₂O₃ | –48 mesh | unknown | Alcoa T64-48-LI |

The starting powder composition comprises, by weight, 28.4% –325 mesh alumina, 0.85% –48 mesh alumina, 18.07% silica, 10.82% aluminum, 3.61% –300 mesh graphite and 38.24% –20+150 mesh graphite. The use of two different carbon sizes improved the refractoriness and machinability of the final product. The insulating material is formed according to the following steps:

(i) A 500 g of the starting powder mixture is mixed with 250 ml liquid and adequate amount (preferably more than about 10 times by weight of the powder) of hard zirconium oxide balls in a glass container, and then the container is put in a rotary mixer for 12 hours.

(ii) The powder mixture is air dried for about 12 hours.

(iii) About 50 ml colloidal alumina is added to the powder mixture, and resulting mixture is thoroughly mixed.

(iv) The mixture is put into a 6.5×3.25×2 inch die, and is then pressed under pressure of 500 Psi by using an automatic compacting machine to form a green (i.e. uncured) compacted sample. The green compacted sample contains some water.

(v) Two drying steps are performed. First the green compacted sample is air dried for 12 hours, and then the sample is placed into a 200° C. furnace for 12 hours.

(vi) The compacted sample is sintered at a temperature above about 1600° C.

Properties of the materials are:

| | |
|---|---|
| Density: | 1.00 g/cm³ |
| Porosity: | 65% |
| Refractoriness: | 1800° C. |
| Color: | White |
| Fiber Content: | Nil |
| Mechanical Properties | |
| Machinability | Extremely easily machinable. Can cut with table knife, hand saw etc. |
| Flexural Strength: (Mpa) | 6.45 |
| Elastic Modulus: (Gpa) | 3.02 |
| Thermal Properties | |
| Linear Thermal Expansion (×10⁻⁶/° C.) | 5.3 (R.T. – 1200° C.) |
| Thermal Conductivity (W/m° C.) | 0.27 (R.T. – 450° C.) |
| Thermal Diffusivity (cm²/sec) | 0.0066 (R.T. – 450° C.) |
| Specific Heat, Cp (cal/g ° C.) | 0.10 (R.T. – 1125° C.) |
| Thermal Shock Resistance (Retained Strength, %) (ΔT–1100° C. Water Quench) | 8.8% |

Example 1 exhibits a thermal shock resistance of 11% retained strength, while Example 2 exhibits a thermal shock resistance of about 8.8% of its retained strength. In contrast, a prior art vacuum-formed ceramic fiber product formed from high alumina bulk fibers and comprising about 84% $Al_2O_3$ and about 16% $SiO_2$ exhibited less than 5% strength when quenched in room temperature water from 1100° C.

Suitable ingredients for use in preparing the insulating material include those ingredients set forth in Table 3.

TABLE 3

Suitable Ingredients

| Powder | Average Particle size | Purity | Source |
|---|---|---|---|
| Al | −325 mesh | 99.5% | JM, Cat No: 11067 |
| Mg | −325 mesh | 99.5% | |
| C | −300 mesh | 99.0% | JM. Cat No: 10129 |
| $SiO_2$ | 5 microns | 99.5% | JM. Cat No: 13024 |
| $Al_2O_3$ | 15 microns | | Metlab. M412 |
| $Al_2O_3$ | −325 mesh | | Alcoa T64-325-LI |
| $Al_2O_3$ | −48 mesh | | Alcoa T64-48-LI |
| $Al_2O_3$ | −60 mesh | | Alcoa T64-60-LI |
| $Al_2O_3$ | −100 mesh | | Alcoa T64-100-LI |
| $ZrO_2$ | −325 mesh | 99+ % | JM. Cat No: 11395 |
| MgO | −200 mesh | 96% | JM. Cat No: 12287 |
| Clays | | | Aldrich, Cat No: 28,523-4 |
| glass beads | 1 mm dia | | |

The preceding examples are set forth to illustrate specific embodiments of the invention, and are not intended to limit the scope of the methods of the present invention. Additional embodiments and modifications within the scope of the claimed invention will be apparent to one of ordinary skill in the art. Accordingly, the scope of the present invention shall be considered in terms of the following claims, and is understood not to be bound by or limited to the details of the compositions or methods described in the specification.

What is claimed is:

1. An insulation material, wherein the material is substantially free of fibers, has a density of less than about 2.5 g/cc and a thermal conductivity of less than about 5 W/Km, the insulation material being formed from a composition which is substantially free of pitch and which comprises:
   a. from about 2% to about 40%, by weight, carbon;
   b. an ingredient selected from the group consisting of $Al_2O_3$, $ZrO_2$, MgO, $SiO_2$, and mixtures thereof, in an amount ranging from about 25% to about 95% by weight of the composition;
   c. carrier selected from the group consisting of water, clay, clay-water mixtures, polyvinyl alcohol, methanol, ethanol, acetone, polyvinyl butyl, methyl cellulose, stearates, colloidal silica, colloidal alumina, colloidal zirconia, colloidal silica and mixtures thereof, said carrier being present in an amount effective to aid in bonding; and
   d. an anti-oxidant elected from the group consisting of Al, B, Ca, Ce, Cr, Li, Mg, Ti, Zn, Zr and mixtures thereof, said anti-oxidant being present in an amount up to 20% by weight.

2. An insulation material according to claim 1, wherein the insulation material is capable of being cut with hand tools.

3. An insulation material according to claim 1, wherein the insulation material has a melting point of greater than about 1500° C.

4. An insulation material according to claim 1, wherein the insulation material has an electronic electrical conductivity less than about 1/(ohm cm).

5. An insulation material according to claim 1, wherein the insulation material has retained strength of at least about 5% after quenching from 1100° C. to room temperature in water.

6. The insulation material of claim 1, wherein the carbon comprises carbon grains of two different sizes.

7. The insulation material of claim 6, wherein a first carbon source has a particle size of about −300 mesh, and a second carbon source has a particle size of from about −20 to about 150 mesh.

8. A paste composition comprising:
   a. from about 2 to about 40%, by weight, carbon;
   b. an ingredient selected from the group consisting of, and mixtures thereof, in an amount ranging from about 25% to about 95% by weight of the composition;
   c. a carrier selected from the group consisting of water, clay, clay-water mixtures, polyvinyl alcohol, methanol, ethanol, acetone, polyvinyl butyl, methyl cellulose, stearates, colloidal silica, colloidal alumina, colloidal zirconia, colloidal silica and mixtures thereof, said carrier being present in an amount effective to aid in bonding; and
   d. an anti-oxidant elected from the group consisting of Al, B, Ca, Ce, Cr, Li, Mg, Ti, Zn, Zr and mixtures thereof, said anti-oxidant being present in an amount up to 20% by weight;

wherein the paste is substantially free of fibers and pitch.

9. The paste of claim 8, wherein the carbon comprises carbon grains of two different sizes.

10. The paste of claim 9, wherein a first carbon source has a particle size of about −300 mesh, and a second carbon source has a particle size of from about −20 to about 150 mesh.

* * * * *